US00RE45818E

(19) United States
(12) Reissued Patent
Fung

(10) Patent Number: US RE45,818 E
(45) Date of Reissued Patent: Dec. 15, 2015

(54) MIXING PADDLE FOR ICE CREAM MACHINE

(71) Applicant: CONAIR CORPORATION, Stamford, CT (US)

(72) Inventor: Kam Fai Fung, Tuen Mun (HK)

(73) Assignee: CONAIR CORPORATION, Stamford, CT (US)

(21) Appl. No.: 14/480,764

(22) Filed: Sep. 9, 2014

Related U.S. Patent Documents

Reissue of:
(64) Patent No.: 8,425,108
Issued: Apr. 23, 2013
Appl. No.: 12/771,579
Filed: Apr. 30, 2010

(51) Int. Cl.

| | |
|---|---|
| ***B01F 9/12*** | (2006.01) |
| ***A23G 9/22*** | (2006.01) |
| ***B01F 7/00*** | (2006.01) |
| ***B01F 7/32*** | (2006.01) |
| ***B01F 15/06*** | (2006.01) |

(52) U.S. Cl.
CPC *A23G 9/22* (2013.01); *A23G 9/224* (2013.01); *B01F 7/00208* (2013.01); *B01F 7/32* (2013.01); *B01F 15/065* (2013.01); *B01F 2015/061* (2013.01)

(58) Field of Classification Search
CPC ..... A23G 9/22; A23G 9/224; B01F 7/00208; B01F 7/32; B01F 15/065; B01F 2015/061
USPC ..... 366/221, 309, 312, 313, 325.7, 325.8, 366/325.94, 328.8; 62/342–343
See application file for complete search history.

(56) References Cited

U.S. PATENT DOCUMENTS

| | | | | |
|---|---|---|---|---|
| 2,004,446 | A * | 6/1935 | Mills | 366/312 |
| 3,651,926 | A * | 3/1972 | Elfast, Jr. | 206/456 |
| 4,472,063 | A * | 9/1984 | Eickelmann | 366/129 |
| 4,900,158 | A * | 2/1990 | Ugolini | 366/143 |
| 5,549,384 | A * | 8/1996 | Reynolds | 366/299 |
| 5,603,229 | A * | 2/1997 | Cocchi et al. | 62/343 |
| 5,865,539 | A * | 2/1999 | Rogers | 366/325.8 |
| 6,205,806 | B1 * | 3/2001 | Huang | 62/343 |
| 7,451,613 | B2 * | 11/2008 | Barraclough et al. | 62/343 |
| D640,898 | S * | 7/2011 | Sandor et al. | D7/412 |
| 2012/0092953 | A1 * | 4/2012 | Fung | 366/343 |

* cited by examiner

*Primary Examiner* — Joseph Kaufman
(74) *Attorney, Agent, or Firm* — Grogan, Tuccillo & Vanderleeden, LLP

(57) ABSTRACT

A mixing paddle for use in a conventional ice cream maker includes two vertical arms that have outer contact edges that exceed the inner diameter of the freezer bowl in which they are positioned during use. This enables the contact edges to effectively scrape ice cream ingredients from the inner wall of the bowl during use and direct the ingredients toward the center of the bowl. The mixing paddle also comprises two cross-members that have pin-wheel style shapes that move ice cream ingredients vertically during use. The combined effect of the vertical arms and the cross-members optimally and uniformly mixes the ice cream ingredients during use and ensures efficient cooling.

7 Claims, 5 Drawing Sheets

MIXING PADDLE FOR ICE CREAM MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

None.

TECHNICAL FIELD

The present invention relates to ice cream making machines designed for personal or home use and, more particularly, to mixing paddle components used in such machines.

BACKGROUND OF THE INVENTION

Various ice cream making machines for personal or home use exist which share common characteristics including: small size, convenient storage and use, base with internal motor, freezing bowl, mixing paddle, and cover. In use, the freezing bowl is cooled in a freezer for a period of time. The mixing paddle is placed in the bowl and moves relative to the bowl in either one of two arrangements. In the first, the bowl is in engagement with a drive mechanism that transfers rotational force from the motor to cause the bowl to rotate while the paddle is held stationary. In the other arrangement, the bowl is held stationary and the paddle is rotated relative to the bowl. Ice cream ingredients are placed in the bowl and the cover is positioned. As the mixing paddle and bowl move relative to each other the ingredients are cooled by the temperature of the pre-frozen bowl, resulting in ice cream.

Known ice cream mixing paddles are designed to span a distance just short of the inner diameter of the mixing bowl so that direct contact is not made with the inner walls of the mixing bowl, as the friction plus the load of the ice cream might stall or damage the motor or paddle. At the same time, this prevents some of the ice cream mixture from being pushed into and out of contact with the cold inner wall of the bowl as much as the rest of the ice cream mixture.

OBJECTS OF THE PRESENT INVENTION

It is an object of the present invention to provide an improved mixing paddle for use with a personal or home style ice cream maker that efficiently and effectively moves the ice cream mixture into and out of contact with the inner wall of the freezing bowl evenly and optimally. These and other objects are achieved by the presently described invention.

BRIEF DESCRIPTION OF THE PRESENT INVENTION

A mixing paddle for use in a conventional ice cream maker includes two vertical arms that have outer contact edges that exceed the inner diameter of the freezer bowl in which they are positioned during use. This enables the contact edges to effectively scrape ice cream ingredients from the inner wall of the bowl during use and direct the ingredients toward the center of the bowl. The mixing paddle also comprises two cross-members that have pin-wheel style shapes that move ice cream ingredients vertically during use. The combined effect of the vertical arms and the cross-members optimally and uniformly mixes the ice cream ingredients during use and ensures efficient cooling.

DESCRIPTION OF THE PREFERRED EMBODIMENT

Figure 1A:
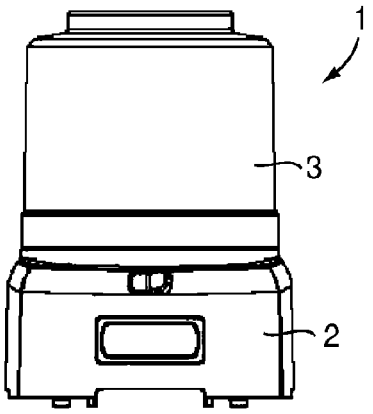
FIG. 1A is a front view of an ice cream maker used in accordance with the present invention.
Figure 1B:
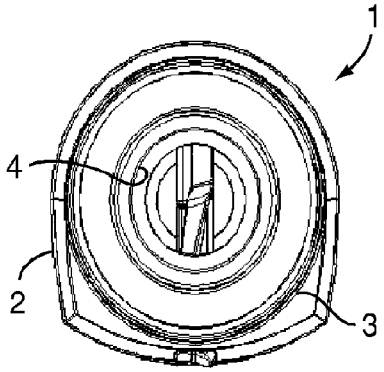
FIG. 1B is a top view of an ice cream maker used in accordance with the present invention.
Figure 1C:
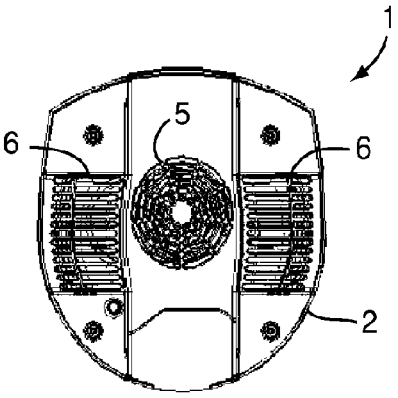
FIG. 1C is a bottom view of an ice cream maker used in accordance with the present invention.
Figure 1D:
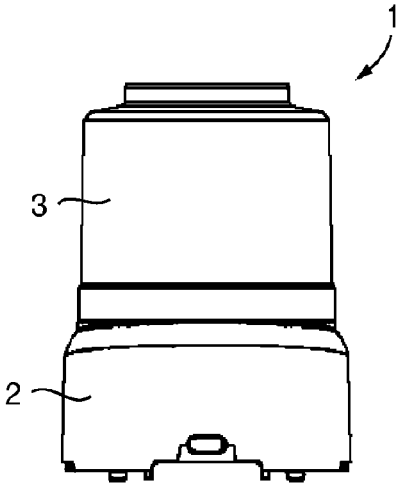
FIG. 1D is a rear view of an ice cream maker used in accordance with the present invention.
Figure 1E:
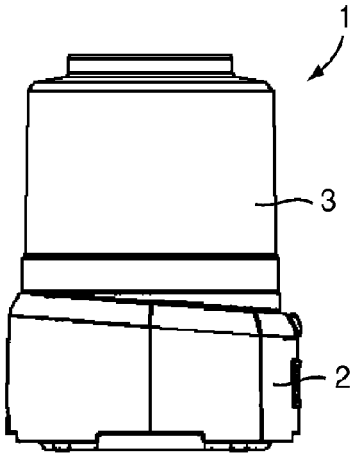
FIG. 1E is a first side view of an ice cream maker used in accordance with the present invention.
Figure 1F:
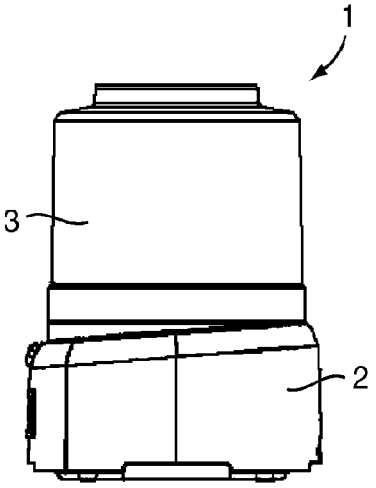
FIG. 1F is a second side view of an ice cream maker used in accordance with the present invention.
Figure 2:
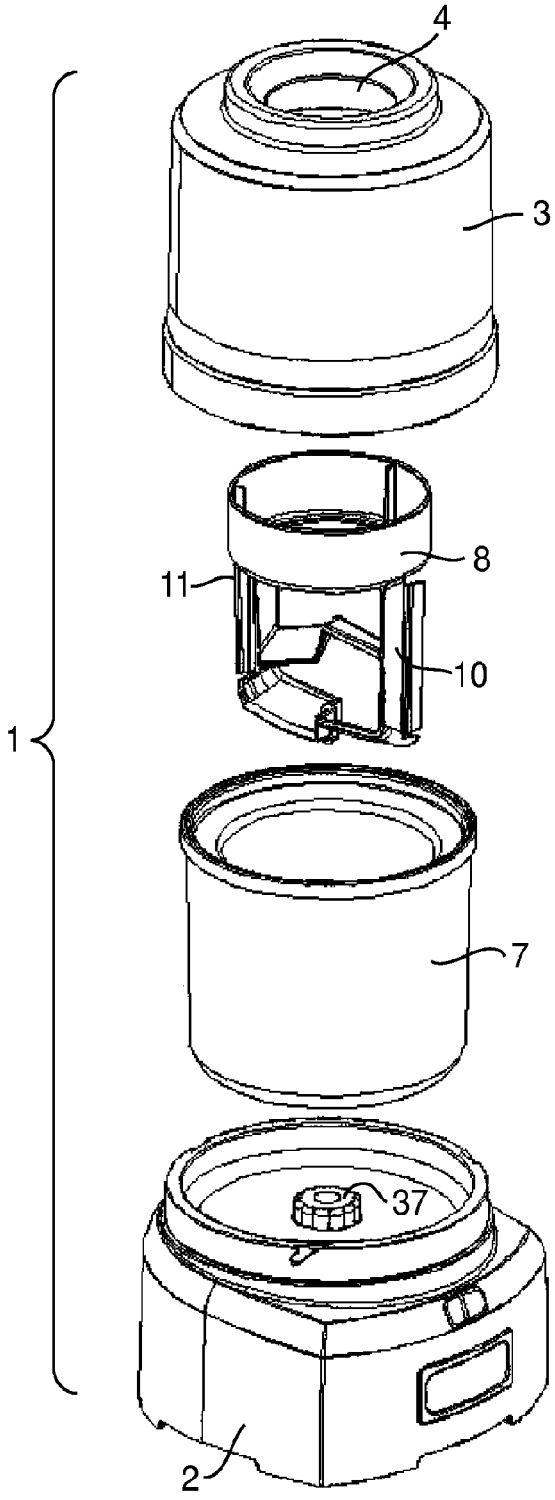
FIG. 2 is an exploded view of an ice cream mixing paddle and ice cream maker according to and used in accordance with the present invention.
Figure 3A:
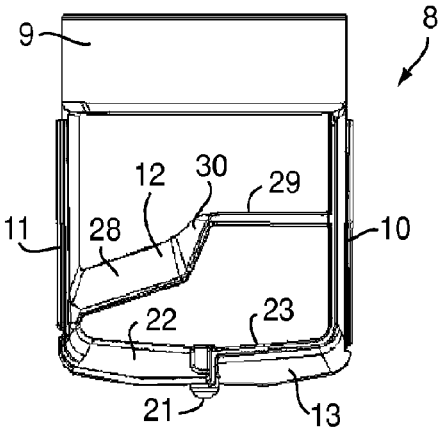
FIG. 3A is a front view of an ice cream mixing paddle according to the present invention.
Figure 3B:
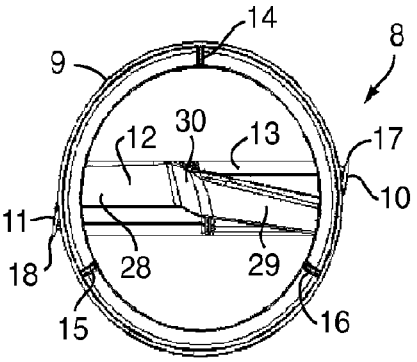
FIG. 3B is a top view of an ice cream mixing paddle according to the present invention.
Figure 3C:
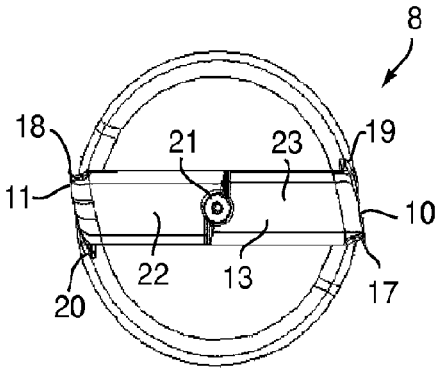
FIG. 3C is a bottom view of an ice cream mixing paddle according to the present invention.
Figure 3D:
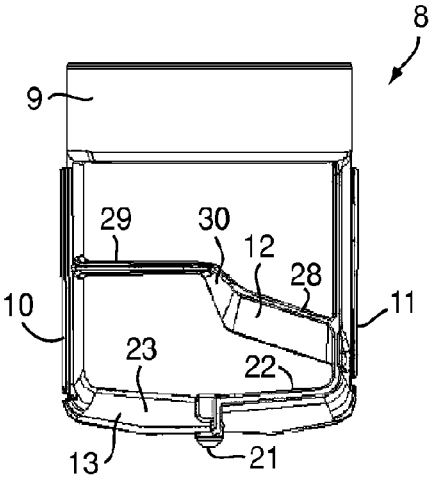
FIG. 3D is a rear view of an ice cream mixing paddle according to the present invention.
Figure 3E:
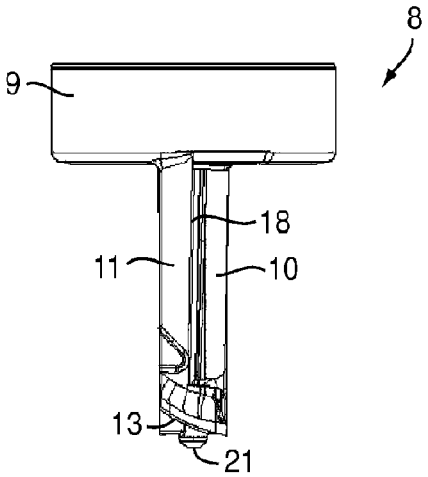
FIG. 3E is a first side view of an ice cream mixing paddle according to the present invention.
Figure 3F:
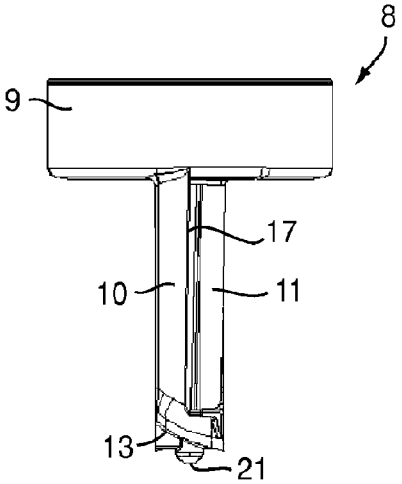
FIG. 3F is a second side view of an ice cream mixing paddle according to the present invention.

Referring to the FIGS. 1A-1F, an ice cream maker 1 comprises a base 2 and lid 3. The lid 3 has an opening 4 at its top surface. The base 2 houses an internal motor and drive assembly (not shown) of a conventional type. The bottom surface of the base 2 includes vents 5, 6 to accommodate cooling during the motor operation. As shown in FIG. 2, a freezer bowl 7 is adapted to be mounted on the base 2 and a mixing paddle 8 is adapted to be positioned in the freezer bowl 7. When assembled, the lid 3 covers both the freezer bowl 7 and the paddle 8.

Figure 4A:
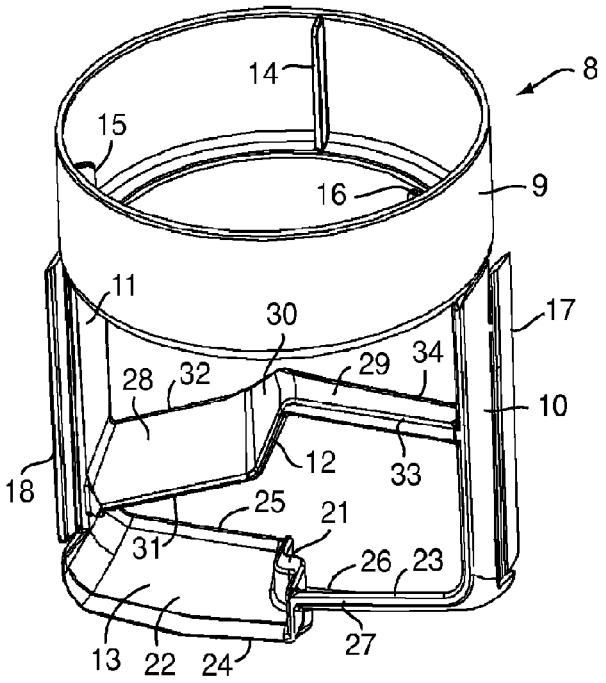
FIG. 4A is a first perspective view of an ice cream mixing paddle according to the present invention.
Figure 4B:
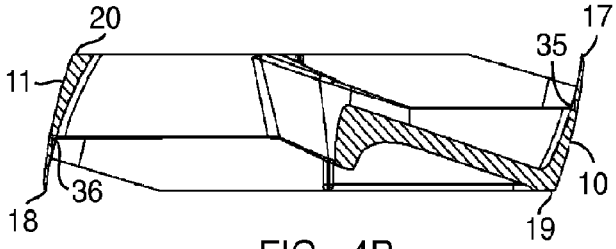
FIG. 4B is a top, cross-sectional view of and ice cream mixing paddle according to the present invention.
Figure 4C:
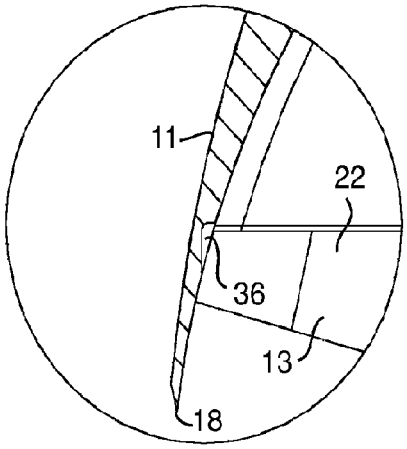
FIG. 4C is an enlarged, top cross-sectional view of a contact edge of an arm of an ice cream mixing paddle according to the present invention.

The mixing paddle 8, made of plastic or a material having similar properties, as shown in FIGS. 3A-3F, comprise a ring-shaped top portion 9, a first longitudinal arm 10, a second longitudinal arm 11, an upper cross-member 12, and a lower cross-member 13. The top portion 9 includes internal ribs 14, 15, 16 to lock against rotation relative to the lid 3 when attached thereto. The longitudinal arms 10, 11 are positioned at a relative distance to each other and aligned with the top portion 9 such that they are positioned generally coincident with the annular wall of the top potion 9, except that the longitudinal arms 10, 11 are each angled so as to be tangentially oriented with respect to the annular wall of the top portion 9. This is illustrated in the top and bottom views labeled, respectively, as FIG. 3B and 3C. Due to this orientation, a contact edge 17 of the first arm 10 and a contact edge 18 of the second arm 11 are each distanced further from the center hub 21 of the paddle 8 than, respectively, an inner edge 19 of the first arm 10 and an inner edge 20 of the second arm 11. Referring to FIGS. 4A and 4B, the first arm 10 includes a longitudinally extending groove 35 adjacent to the contact edge 17 to enable it to flex primarily at the groove 35 when the contact edge 17 is in contact with the bowl's inner wall during use. Similarly, as best shown in FIGS. 4B and 4C, a groove 36 exists on the second arm 11 of the same configuration and for the same purpose. This facilitates positive contact with the bowl during use as described below.

The center hub 21 of the paddle 8 is part of the lower cross-member 13 and is positioned in alignment with the center of the circle formed by the top portion 9. The lower cross-member 13 has a first side 22 and a second side 23. The two sides 22, 23 are out-of-plane and angled with respect to each other in the same manner as a pinwheel or propeller, with the hub 21 forming the center of rotation. The first side 22 has a leading edge 24 and a trailing edge 25. The second side 23 has a leading edge 26 and a trailing edge 27.

The upper cross-member 12 has a first side 28 and a second side 29 separate from each other by a middle portion 30. The first and second sides 28, 29 are out-of-plane and angled with respect to each other in the same manner as a pinwheel or propeller, with the middle portion 30 forming the center of rotation. The first side 28 has a leading edge 31 and a trailing edge 32. The second side 29 has a leading edge 33 and a trailing edge 34.

During use, a user places the freezer bowl 7 into a freezer appliance or outside, if sufficiently cold outside, to cool the temperature of the freezer bowl 7. The freezer bowl 7 may be of a type having a double-wall construction forming an internal compartment that is filled with cold-retention material such as liquid or gel that can be frozen. Once the freezer bowl 7 is cooled, it is positioned on the base 2. The bowl 7 is positioned such that drive engaging means (not shown) on the bottom of the bowl 7 engage the drive output means 37 of the motor that are rotationally driven. This enables the bowl 7 to be rotated relative to the base 2 during operation. The paddle 8 is positioned in the bowl 7 such that the hub 21 rests on the bottom of the bowl 7 and the lid 3 is placed over the bowl 7 and mounted to the base 2. Ice cream ingredients are added to the bowl 7 through the opening 4. The ingredients immediately begin chilling. Once the motor is activated, the bowl 7 begins to rotate relative to the base 2. The lid 3 is fixed relative the base 2 and the paddle 8 is fixed relative to the lid 3 by attaching to the lid 3 at its top portion 9. Thus, the bowl 7 rotates relative to the base 2, to the lid 3 and to the paddle 8. The relative movement between the bowl 7 and the paddle 8 causes the ice cream ingredients in the bowl 7 to be mixed and moved relative to the bowl 7.

Figure 5A:
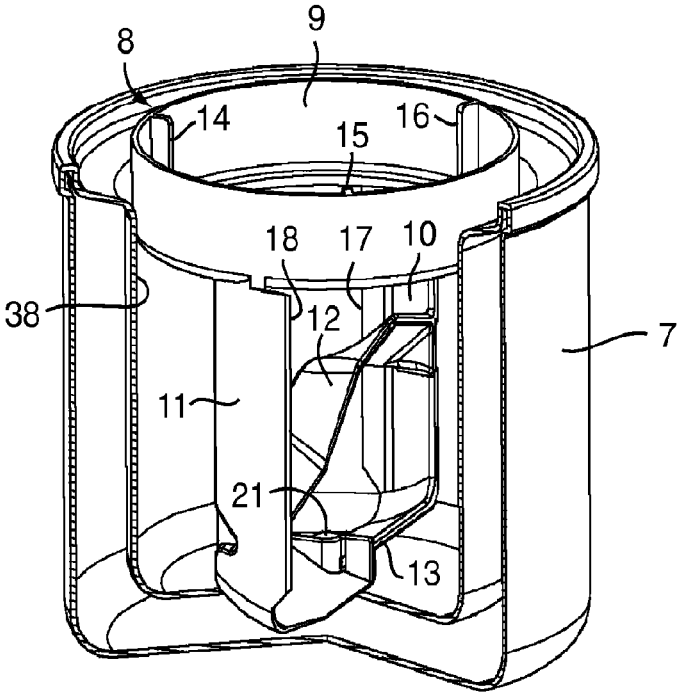
FIG. 5A is a second perspective view of an ice cream mixing paddle and a part-sectional, perspective view of a freezer bowl according to the present invention.
Figure 5B:
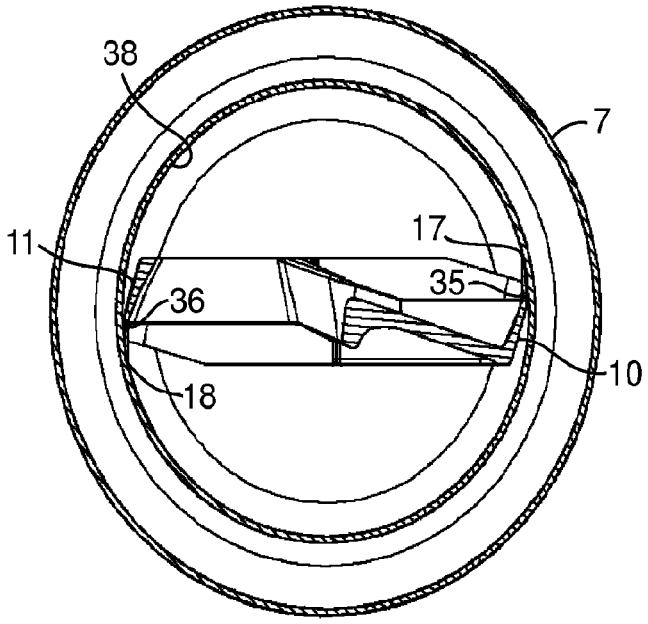
FIG. 5B is a top view of an ice cream mixing paddle and freezer bowl according to the present invention.

Referring to FIGS. 5A-5B, the contact edges 17, 18 are always in contact with the inner wall surface 38 of the freezer bowl 7 due to the flexibility of the contact edges 17, 18. This enables all of the ingredients to be more evenly mixed by the longitudinal arms 10, 11 and moved into and out of contact with the inner wall surface 38. The edges 17, 18 move ingredients away from the inner wall surface 38 and towards the center of the bowl so that more ingredients can assume the position of contact with the wall surface 38. The cycle repeats continuously during operation, As a result, uniform and efficient cooling of ingredients is achieved, as is optimal mixing. The upper and lower cross-members 12, 13 move the ingredients vertically and laterally due to their pinwheel shapes and rotational movement. This vertical movement, combined with the above-described movement cause by the longitudinal arms 10, 11 enhances the mixing and cooling.

While the preferred embodiment has been described herein, various modifications may be made without departing from the scope of the present invention.

What is claimed is:

1. A mixing paddle for use with an ice cream maker, said paddle comprising a top portion [of a generally cylindrical shape having open top and bottom ends and an inner wall surface and an outer wall surface];

a first longitudinal arm attached to a lower end of said top portion and extending vertically downwardly and terminating at a distal end, said first longitudinal arm having a first outer edge running vertically substantially along its length, extending radially outwardly with respect to said top portion, [and laying in a plane that is tangential to an imaginary circle defined by said top portion's shape,] and comprising a first groove running vertically substantially along its length;

a second longitudinal arm attached to a lower end of said top portion and extending vertically downwardly and terminating at a distal end, said second longitudinal arm having a second outer edge running vertically substantially along its length, extending radially outwardly with respect to said top portion, [and laying in a plane that is tangential to an imaginary circle defined by said top portion's shape,] and comprising a second groove running vertically substantially along its length; and a first cross-member attached to the respective distal ends of said first and second longitudinal arms, connecting said first and second longitudinal arms to each other.

2. A mixing paddle according to claim 1, wherein said first cross-member has a center portion, a first blade portion on one side of the center portion aligned with a first plane, and a second blade portion on the other side of the center portion aligned with a second plane that is not parallel to said first plane.

3. A mixing paddle according to claim 1, wherein said paddle is made of plastic.

4. A mixing paddle according to claim 1, further comprising a second cross-member attached to said first and second longitudinal arms, connecting said first and second longitudinal arms to each other.

5. A mixing paddle according to claim 4, wherein said second cross-member has a center portion, a first blade portion on one side of the center portion aligned with a first plane, and a second blade portion on the other side of the center portion aligned with a second plane that is not parallel to said first plane.

*6. A mixing paddle according to claim 1, wherein said top portion is of a generally cylindrical shape and has open top and bottom ends and an inner wall surface and an outer wall surface.*

*7. A mixing paddle according to claim 6, wherein*

*said first longitudinal arm lies in a plane that is tangential to an imaginary circle defined by said top portion's shape; and*

*said second longitudinal arm lies in a plane that is tangential to said imaginary circle defined by said top portion's shape.*

* * * * *